US012580804B2

(12) United States Patent
Vaishnavi et al.

(10) Patent No.: US 12,580,804 B2
(45) Date of Patent: Mar. 17, 2026

(54) NETWORK DEVICE DETERMINING A SYSTEM ISSUE OF ANOTHER NETWORK DEVICE

(71) Applicant: Lenovo (Singapore) PTE. LTD., New Tech Park (SG)

(72) Inventors: Ishan Vaishnavi, Munich (DE); Andreas Kunz, Ladenburg (DE); Sheeba Backia Mary Baskaran, Friedrichsdorf (DE); Apostolis Salkintzis, Athens (GR); Dimitrios Karampatsis, Ruislip (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 123 days.

(21) Appl. No.: 17/279,571

(22) PCT Filed: Sep. 11, 2020

(86) PCT No.: PCT/EP2020/075551
§ 371 (c)(1),
(2) Date: Mar. 24, 2021

(87) PCT Pub. No.: WO2022/053148
PCT Pub. Date: Mar. 17, 2022

(65) Prior Publication Data
US 2022/0311656 A1     Sep. 29, 2022

(51) Int. Cl.
H04L 41/0631      (2022.01)
H04L 41/0604      (2022.01)
(Continued)

(52) U.S. Cl.
CPC ...... H04L 41/0631 (2013.01); H04L 41/0613 (2013.01); H04L 41/0686 (2013.01); H04L 43/065 (2013.01); H04L 43/0817 (2013.01)

(58) Field of Classification Search
CPC ............. H04L 41/0613; H04L 41/0631; H04L 41/0686; H04L 43/065; H04L 43/0817
(Continued)

(56) References Cited

U.S. PATENT DOCUMENTS 5,416,725 A   *   5/1995   Pacheco ................. G08B 25/14
                                                        340/508
8,238,258 B2 *   8/2012   Manthoulis ........... H04L 41/509
                                                        370/252
(Continued)

FOREIGN PATENT DOCUMENTS

CN          108463973 A      8/2018
CN          108702367 A     10/2018
(Continued)

OTHER PUBLICATIONS

Margaret Rouse, Cellular Network, Techopedia, p. 2, (Sep. 2011) (Year: 2011).*
(Continued)

*Primary Examiner* — David P Zarka
(74) *Attorney, Agent, or Firm* — Kunzler Needham & Hilton

(57)     ABSTRACT

Apparatuses, methods, and systems are disclosed for determining a network system issue. One method (900) includes a first network device determining (902) a system issue corresponding to at least one second network device. The first network device is an analytics entity in a cellular network and the at least one second network device is a managed entity in the cellular network, and the system issue comprises a software issue, a hardware issue, a compatibility issue, an issue with an interaction between a plurality of second network devices comprising the at least one second network device, an issue with an interaction between the at least one second network device and another device, or some combination thereof. The analytics entity comprises an (Continued)

100 entity that analyzes one or more devices to determine descriptive analytics, predictive analytics, and/or prescriptive analytics. The method (900) includes providing (904) a notification indicating the system issue.

20 Claims, 9 Drawing Sheets

(51) Int. Cl.

| | |
|---|---|
| *H04L 41/0686* | (2022.01) |
| *H04L 43/065* | (2022.01) |
| *H04L 43/0817* | (2022.01) |

(58) Field of Classification Search

USPC ........................................................ 709/224

See application file for complete search history.

(56) References Cited

U.S. PATENT DOCUMENTS

| | | | | |
|---|---|---|---|---|
| 9,978,248 | B2 * | 5/2018 | Pickett .................... | G05B 23/00 |
| 10,397,810 | B2 | 8/2019 | Yang et al. | |
| 10,993,200 | B1 * | 4/2021 | Sihotang ............... | H04W 8/186 |
| 2002/0012323 | A1 * | 1/2002 | Petite ................... | G05B 19/042 |
| | | | | 370/252 |
| 2003/0196136 | A1 * | 10/2003 | Haynes ............... | G06F 11/3495 |
| | | | | 714/13 |
| 2006/0248522 | A1 * | 11/2006 | Lakshminarayanan ... | G06F 8/61 |
| | | | | 707/999.102 |
| 2007/0027981 | A1 * | 2/2007 | Coglitore ........... | H04L 43/0817 |
| | | | | 709/224 |
| 2009/0034419 | A1 * | 2/2009 | Flammer, III .......... | H04L 45/22 |
| | | | | 370/238 |
| 2015/0227409 | A1 * | 8/2015 | Ricken .................... | G16Z 99/00 |
| | | | | 714/47.2 |
| 2016/0006641 | A1 * | 1/2016 | Wiggs ................. | H04L 43/0811 |
| | | | | 709/224 |
| 2016/0133131 | A1 * | 5/2016 | Grimm ............... | G08G 1/0141 |
| | | | | 701/117 |
| 2017/0289184 | A1 * | 10/2017 | C ........................ | H04L 63/1425 |
| 2018/0196133 | A1 * | 7/2018 | Sun ......................... | G01S 15/86 |
| 2018/0220310 | A1 * | 8/2018 | Ekambaram .......... | H04L 67/025 |
| 2018/0367436 | A1 * | 12/2018 | Kim ....................... | H04L 12/40 |
| 2019/0018965 | A1 * | 1/2019 | Hoscheit ............. | H04L 63/1408 |

| | | | | |
|---|---|---|---|---|
| 2019/0235943 | A1 * | 8/2019 | Gordani .............. | G06F 11/0793 |
| 2019/0379576 | A1 * | 12/2019 | Narnakaje Venugopala ............... | |
| | | | | H04L 41/142 |
| 2019/0394655 | A1 * | 12/2019 | Rahman .............. | H04L 41/5058 |
| 2021/0160147 | A1 * | 5/2021 | Chou .................. | H04L 41/5025 |
| 2022/0078690 | A1 * | 3/2022 | Rahman ................ | H04W 24/10 |
| 2022/0121509 | A1 * | 4/2022 | Jacob ..................... | G06N 20/00 |

FOREIGN PATENT DOCUMENTS

| | | | |
|---|---|---|---|
| EP | 2066143 | A1 | 6/2009 |
| EP | 3420701 | B1 | 6/2021 |
| WO | 2019158737 | A1 | 8/2019 |
| WO | 2020140041 | A1 | 7/2020 |
| WO | 2021044041 | A1 | 3/2021 |

OTHER PUBLICATIONS

3GPP, "3rd Generation Partnership Project; Technical Specification Group Services and System Aspects; Management and orchestration; Concepts, use cases and requirements (Release 16)", 3GPP TS 28.530 V16.2.0, Jul. 2020, pp. 1-31.

3GPP, "3rd Generation Partnership Project; Technical Specification Group Services and System Aspects; Management and orchestration; Generic management services; (Release 16)", 3GPP TS 28.532 V16.4.0, Jun. 2020, pp. 1-245.

3GPP, "3rd Generation Partnership Project; Technical Specification Group Services and System Aspects; Management and orchestration; Performance assurance (Release 16)", 3GPP TS 28.550 V16. 5.0, Jul. 2020, pp. 1-116.

3GPP, "3rd Generation Partnership Project; Technical Specification Group Services and System Aspects; Management and orchestration; Provisioning; (Release 16)", 3GPP TS 28.531 V16.6.0, Jul. 2020, pp. 1-72.

Nokia, "Security riak assessment analytics use case", 3GPP TSG-SA5 Meeting #132e S5-204353, 17th Aug. 28, 2020, pp. 1-4.

3GPP, "3rd Generation Partnership Project; Technical Specification Group Services and System Aspects; Management and orchestration; Study on enhancement of Management Data Analytics (MDA) (Release 17)", 3GPP TR 28.809 V0.4.0, Jun. 2020, pp. 1-49.

"International Search Report", Patent Cooperation Treaty, Jun. 1, 2021.

"Written Opinion of the International Searching Authority", Patent Cooperation Treaty, Jun. 1, 2021.

* cited by examiner

100

200

300

700

| ME 702 | Performance Measurements Collection 704 | Analytics Service Producer 706 | Orchestration Service Producer 708 | Resource Configuration Producer 710 |
|---|---|---|---|---|

712

714

716

718

720

722

724

726

728

730

ME-R 732

800

| ME | Performance | MDAS | Provisioning |
| 802 | Assurance | Producer | Service |
| | Service Producer | 806 | Producer |
| | 804 | | 808 |

810

812

814

816

818

820

822

824

ME-R
826

828

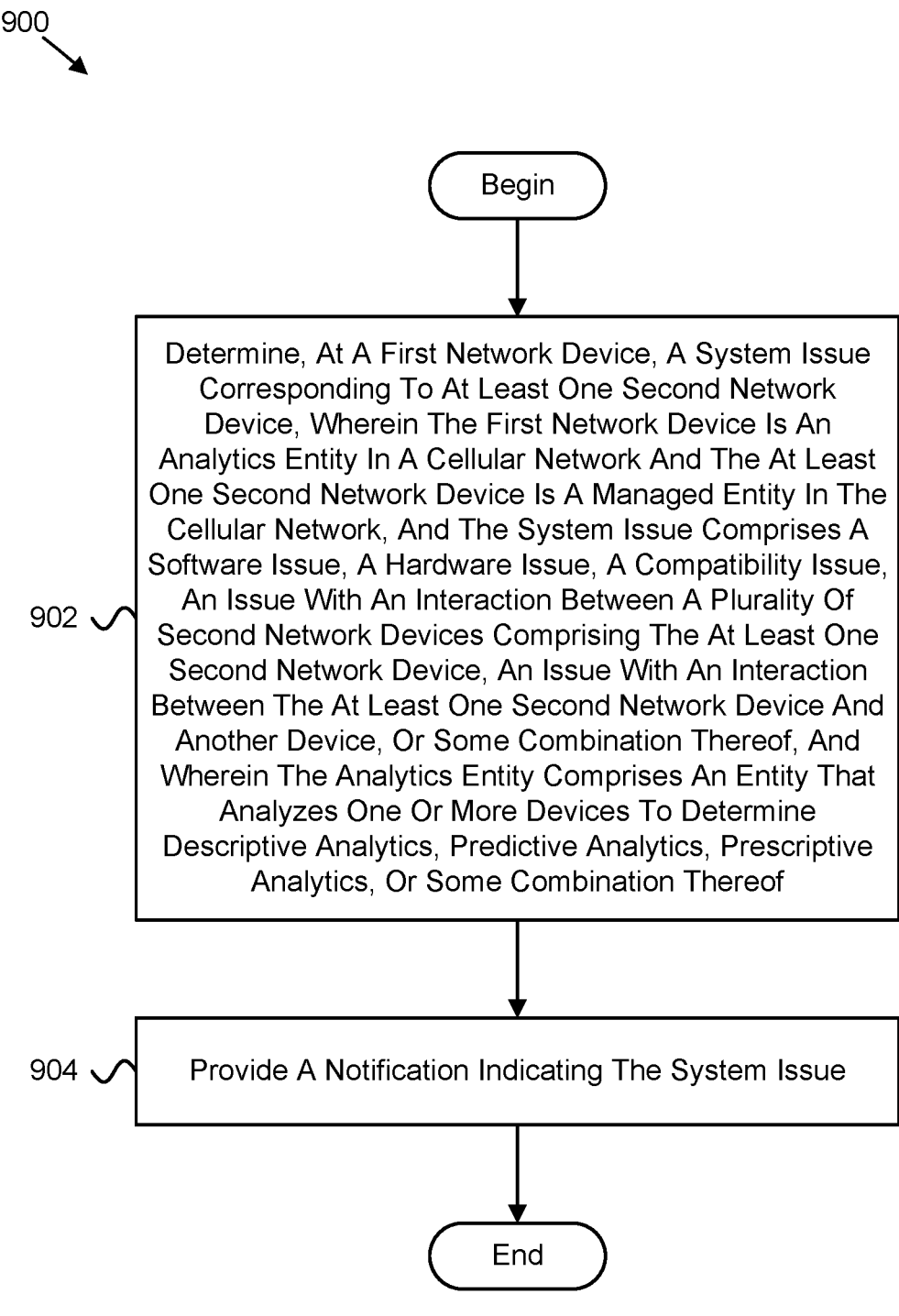

900

Begin

902　Determine, At A First Network Device, A System Issue Corresponding To At Least One Second Network Device, Wherein The First Network Device Is An Analytics Entity In A Cellular Network And The At Least One Second Network Device Is A Managed Entity In The Cellular Network, And The System Issue Comprises A Software Issue, A Hardware Issue, A Compatibility Issue, An Issue With An Interaction Between A Plurality Of Second Network Devices Comprising The At Least One Second Network Device, An Issue With An Interaction Between The At Least One Second Network Device And Another Device, Or Some Combination Thereof, And Wherein The Analytics Entity Comprises An Entity That Analyzes One Or More Devices To Determine Descriptive Analytics, Predictive Analytics, Prescriptive Analytics, Or Some Combination Thereof 904　Provide A Notification Indicating The System Issue End

FIG. 9

NETWORK DEVICE DETERMINING A SYSTEM ISSUE OF ANOTHER NETWORK DEVICE

FIELD

The subject matter disclosed herein relates generally to wireless communications and more particularly relates to determining a network system issue.

BACKGROUND

The following abbreviations are herewith defined, at least some of which are referred to within the following description: Third Generation Partnership Project ("3GPP"), $5^{th}$ Generation ("5G"), 5G System ("5GS"), 5G QoS Identifiers ("5QIs"), Authentication, Authorization, and Accounting ("AAA"), Positive-Acknowledgment ("ACK"), Application Function ("AF"), Artificial Intelligence ("AI"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Application Programmable Interface ("API"), Access Stratum ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Channel Busy Ratio ("CBR"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Core Network ("CN"), Coordinated Multipoint ("CoMP"), Category of Requirements ("CoR"), Channel Occupancy Time ("COT"), Cyclic Prefix ("CP"), Channel Quality Indicator ("CQI"), Cyclical Redundancy Check ("CRC"), Channel State Information ("CSI"), Channel State Information-Reference Signal ("CSI-RS"), Common Search Space ("CSS"), Control Resource Set ("CORE-SET"), Discrete Fourier Transform Spread ("DFTS"), Downlink Control Information ("DCI"), Downlink Feedback Information ("DFI"), Dynamic Grant ("DG"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), End-to-end ("E2E"), Enhanced Clear Channel Assessment ("eCCA"), Enhanced Mobile Broadband ("eMBB"), Evolved Node B ("eNB"), Enhanced V2X ("eV2X"), Extensible Authentication Protocol ("EAP"), Enhanced ICIC ("eICIC"), Effective Isotropic Radiated Power ("EIRP"), Evolved Packet System ("EPS"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), Guaranteed Bit Rate ("GBR"), Guaranteed Flow Bit Rate ("GFBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), Generic Public Subscription Identifier ("GPSI"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Inter-cell Interference Coordination ("ICIC"), Identity or Identifier ("ID"), Information Element ("IE"), Industrial Internet of Things ("IIoT"), International Mobile Equipment Identity ("IMEI"), International Mobile Subscriber Identity ("IMSI"), International Mobile Telecommunications ("IMT"), Internet-of-Things ("IoT"), Intelligent Transportation Systems ("ITS"), Key Performance Indicator ("KPI"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Level of Automation ("LoA"), Line of Sight ("LOS"), Long Term Evolution ("LTE"), LTE Vehicle ("LTE-V"), Multiple Access ("MA"), Medium Access Control ("MAC"), Multimedia Broadcast Multicast Services ("MBMS"), Maximum Bit Rate ("MBR"), Minimum Communication Range ("MCR"), Modulation Coding Scheme ("MCS"), Management Data Analytics Service ("MDAS"), Management and Orchestration Data Analytics Function ("MDAF"), Managed Entity ("ME"), Mobile Edge Computing ("MEC"), Master Information Block ("MIB"), Multiple Input Multiple Output ("MIMO"), Machine Learning ("ML"), Mobility Management ("MM"), Mobility Management Entity ("MME"), Master Node ("MN"), Management Function ("MnF" or "MF"), Mobile Network Operator ("MNO"), Management Service ("MnS"), Mobile Originated ("MO"), Mean Opinion Score ("MOS"), massive MTC ("mMTC"), Maximum Power Reduction ("MPR"), Machine Type Communication ("MTC"), Multiple Transmission and Reception Point ("M-TRP"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Exposure Function ("NEF"), Network Exposure Function/Service Capability Exposure Function ("NEF/SCEF"), Network Function ("NF"), Non-LOS ("NLOS"), Next Generation ("NG"), NG 5G S-TMSI ("NG-5G-S-TMSI"), Neural Networks ("NN"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Orthogonal Frequency Division Multiple Access ("OFDMA"), Open-Loop ("OL"), Other System Information ("OSI"), Power Angular Spectrum ("PAS"), Physical Broadcast Channel ("PBCH"), Power Control ("PC"), UE to

3

UE interface ("PC5"), Principal Component Analysis ("PCA"), Policy and Charging Control ("PCC"), Primary Cell ("PCell"), Policy and Charging Rules Function ("PCRF"), Policy Control Function ("PCF"), Physical Cell Identity ("PCP"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Precoding Matrix Index ("PMI"), Physical Network Function ("PNF"), Prose Per Packet Priority ("PPPP"), Prose Per Packet Reliability ("PPPR"), PC5 5QI ("PQIs"), Predictive QoS ("P-QoS"), Physical Random Access Channel ("PRACH"), Physical Resource Block ("PRB"), Proximity Services ("ProSe"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), QoS Class Identifier ("QCI"), Quasi Co-Located ("QCL"), QoS Flow Indicator ("QFI"), Quality of Experience ("QoE"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element Group ("REG"), Rank Indicator ("RI"), RAN Intelligent Controller ("RIC"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Information ("RNI"), RNI Service ("RNIS"), Radio Network Temporary Identifier ("RNTI"), Reference Signal ("RS"), Recursive Model ("RM"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Service Capability Exposure Function ("SCEF"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Space Division Multiplexing ("SDM"), Service Data Unit ("SDU"), Security Anchor Function ("SEAF"), Service Enabler Architecture Layer ("SEAL"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SMF"), Secondary Node ("SN"), Special Cell ("SpCell"), Semi-Persistent Scheduling ("SPS"), Single Network Slice Selection Assistance Information ("S-NSSAI"), Scheduling Request ("SR"), Signaling

4

Radio Bearer ("SRB"), Shortened TMSI ("S-TMSI"), Survival Time ("ST"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Support Vector Machine ("SVN"), Tracking Area ("TA"), TA Identifier ("TAI"), TA Update ("TAU"), Timing Alignment Timer ("TAT"), Transport Block ("TB"), Transport Block Size ("TBS"), Transmission Configuration Indicator ("TCI"), Time-Division Duplex ("TDD"), Time Division Multiplex ("TDM"), Time Division Orthogonal Cover Code ("TD-OCC"), Time Domain Resource Allocation ("TDRA"), Temporary Mobile Subscriber Identity ("TMSI"), Time of Flight ("ToF"), Transmission Power Control ("TPC"), Transmission Reception Point ("TRP"), Time Sensitive Communication ("TSC"), Time Sensitive Assistance Information ("TSCAI"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Everything ("V2X"), V2X Control Function ("V2XCF"), V2X UE (e.g., a UE capable of vehicular communication using 3GPP protocols), V2X Application Enabler ("VAE"), Visiting AMF ("vAMF"), Virtualized Network Function ("VNF"), Visiting NSSF ("vNSSF"), Visiting PLMN ("VPLMN"), Wide Area Network ("WAN"), and Worldwide Interoperability for Microwave Access ("WiMAX").

In certain wireless communications networks, system issues may be present.

BRIEF SUMMARY

Methods for determining a network system issue are disclosed. Apparatuses and systems also perform the functions of the methods. One embodiment of a method includes determining, at a first network device, a system issue corresponding to at least one second network device, wherein the first network device is an analytics entity in a cellular network and the at least one second network device is a managed entity in the cellular network, and the system issue comprises a software issue, a hardware issue, a compatibility issue, an issue with an interaction between a plurality of second network devices comprising the at least one second network device, an issue with an interaction between the at least one second network device and another device, or some combination thereof, and wherein the analytics entity comprises an entity that analyzes one or more devices to determine descriptive analytics, predictive analytics, prescriptive analytics, or some combination thereof. In some embodiments, the method includes providing a notification indicating the system issue.

One apparatus for determining a network system issue includes a processor that: determines a system issue corresponding to at least one second network device, wherein the first network device is an analytics entity in a cellular network and the at least one second network device is a managed entity in the cellular network, and the system issue comprises a software issue, a hardware issue, a compatibility issue, an issue with an interaction between a plurality of second network devices comprising the at least one second network device, an issue with an interaction between the at least one second network device and another device, or some combination thereof, and wherein the analytics entity comprises an entity that analyzes one or more devices to determine descriptive analytics, predictive analytics, prescriptive analytics, or some combination thereof; and provides a notification indicating the system issue.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 9 is a flow chart diagram illustrating one embodiment of a method for determining a network system issue.

DETAILED DESCRIPTION

Figure 1:
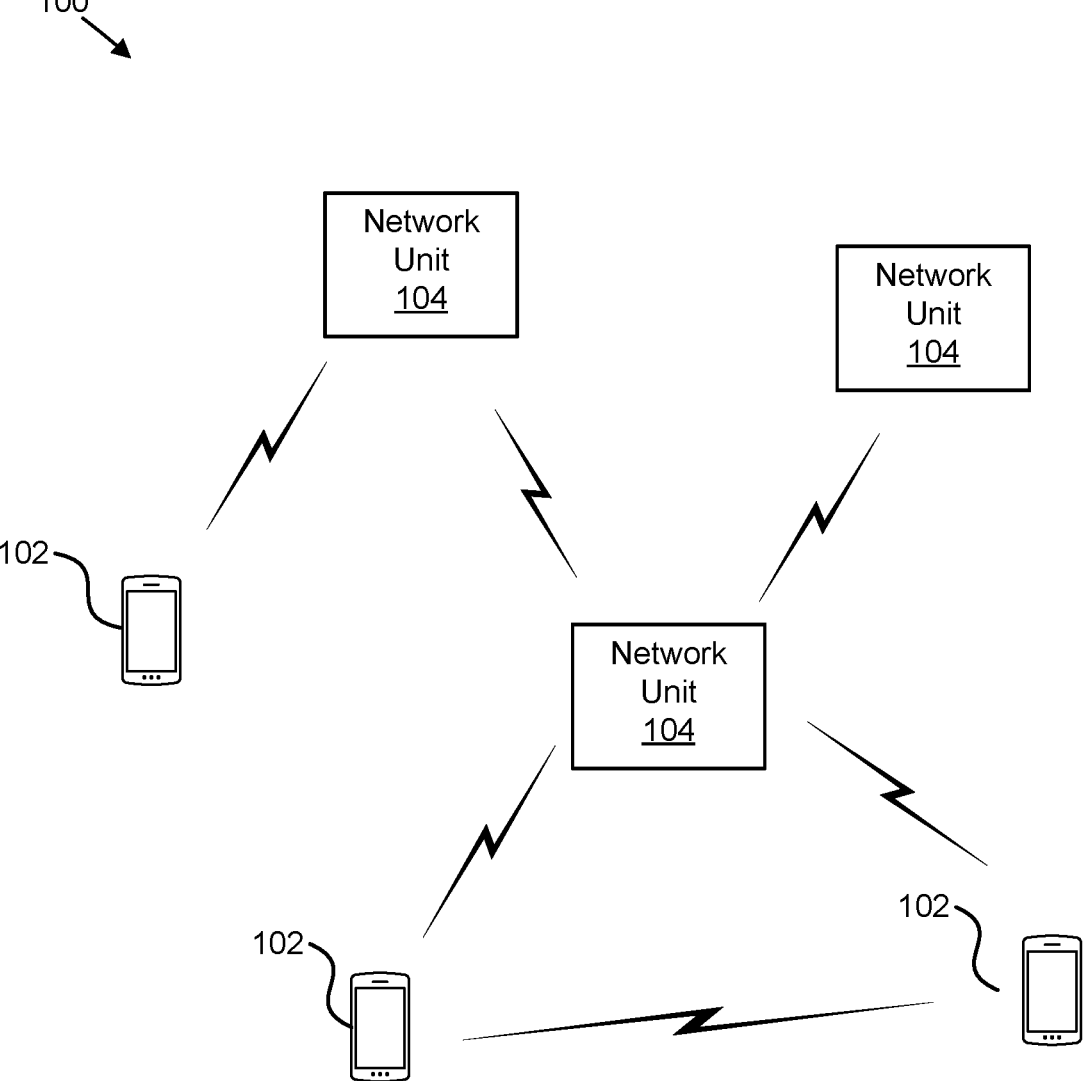
FIG. 1 is a schematic block diagram illustrating one embodiment of a wireless communication system for determining a network system issue.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining a network system issue. In one embodiment, the wireless communication system 100 includes remote units 102, network units 104, and one or more V2X application units 105. Even though a specific number of remote units 102, network units 104, and V2X application units 105 are depicted in FIG. 1, one of skill in the art will recognize that any number of remote units 102, network units 104, and V2X application units 105 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain. In certain embodiments, the V2X application unit 105 may provide application requirements to the remote unit 102 and/or the network unit 104.

In various embodiments, a network unit 104 may determine, at a first network device, a system issue corresponding to at least one second network device, wherein the first network device is an analytics entity in a cellular network and the at least one second network device is a managed entity in the cellular network, and the system issue comprises a software issue, a hardware issue, a compatibility issue, an issue with an interaction between a plurality of second network devices comprising the at least one second network device, an issue with an interaction between the at least one second network device and another device, or some combination thereof, and wherein the analytics entity comprises an entity that analyzes one or more devices to determine descriptive analytics (e.g., describing what has been analyzed), predictive analytics (e.g., making predictions based on an analysis), prescriptive analytics (e.g., determining actions to be performed based on an analysis), or some combination thereof. A managed entity may refer to a managed resource and/or a managed service (e.g., managed entities may be infrastructure resources such as virtual network functions, physical network functions and/or services such as cloud services, virtual network function network services, and so forth). A managed entity may also refer to any managed object, managed resource, and/or managed service (e.g., software and/or hardware entities such as infrastructure resources such as virtual network functions, physical network functions and/or services such as cloud services, virtual network function network services, and so forth). In some embodiments, the network unit 104 may provide a notification indicating the system issue. Accordingly, the network unit 104 may be used for determining a network system issue.

Figure 2:
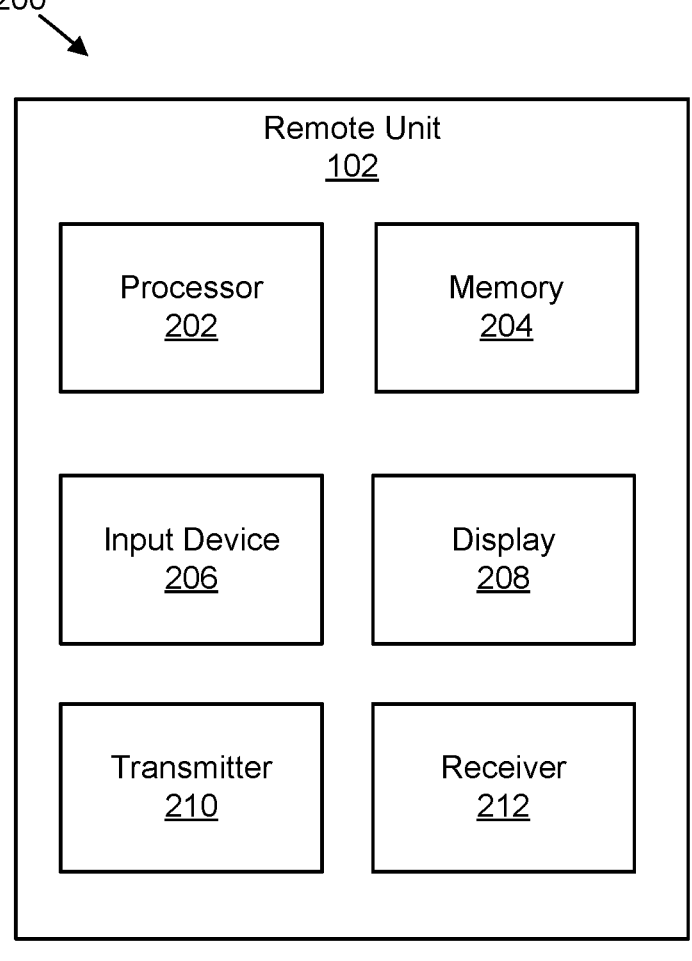
FIG. 2 is a schematic block diagram illustrating one embodiment of an apparatus that may be used for determining a network system issue.

FIG. 2 depicts one embodiment of an apparatus 200 that may be used for determining a network system issue. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
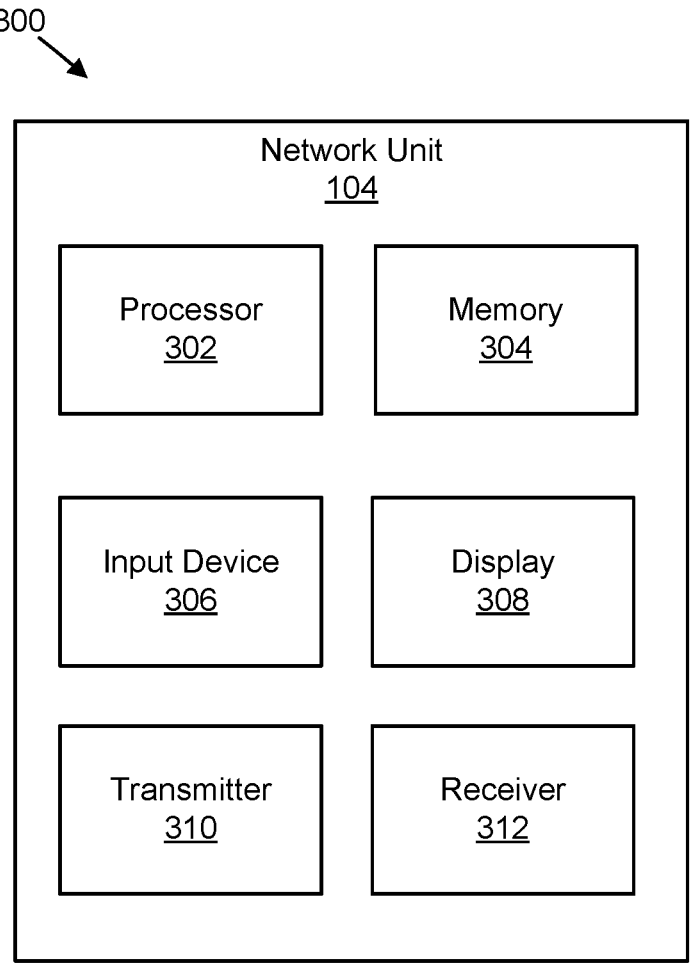
FIG. 3 is a schematic block diagram illustrating one embodiment of an apparatus that may be used for determining a network system issue.

FIG. 3 depicts one embodiment of an apparatus 300 that may be used for determining a network system issue. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the processor 302 may: determine a system issue corresponding to at least one second network device, wherein the first network device is an analytics entity in a cellular network and the at least one second network device is a managed entity in the cellular network, and the system issue comprises a software issue, a hardware issue, a compatibility issue, an issue with an interaction between a plurality of second network devices comprising the at least one second network device, an issue with an interaction between the at least one second network device and another device, or some combination thereof; and provide a notification indicating the system issue, and wherein the analytics entity comprises an entity that analyzes one or more devices to determine descriptive analytics, predictive analytics, prescriptive analytics, or some combination thereof. In some embodiments, the transmitter 310 may be used for transmitting information described herein. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In various embodiments, systems may include multiple managed entities, such as NSI, NSSI, NFs (e.g., run over VNFs or PNFs), that may be subject to risks (e.g., inaccurate programming, unforeseen errors, vulnerabilities in the hosting virtualization platform, protocol design weaknesses, security errors, and so forth). In such embodiments, errors may multiply due to complex interaction with other managed entities. In certain embodiments, outlying managed entities may be managed entities with behaviors that are significantly different based on one or more observed KPIs compared to other similar managed entities.

In some embodiments, thresholds relating to exceptional or outlying behavior may be configured by a human operator based on previous knowledge and/or experience. In such embodiments, if a threshold is crossed during performance measurement of a managed entity, a "notifyThresholdCrossing" notification may be issued by a management system. At a time of the notification, an operator may review available information relating to the notification, a current state of a network, and, based on previous experience and knowledge, identify corrective actions.

In various embodiments, management domains may be a collection of resources that have their own management system. In certain embodiments, a management system may be any set of management services or their implementations in management functions. In some embodiments, management domains may include things such as vendor devices with their own management system, vendor solutions, technical domains such as 3GPP core, 3GPP RAN, cloud domains, datacenters, transport networks with their own controllers, operator administrative domains, country domains, and so forth.

Figure 4:
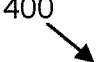
FIG. 4 is a hierarchical block diagram illustrating one embodiment of a logical representation of management domains.
Figure 4:
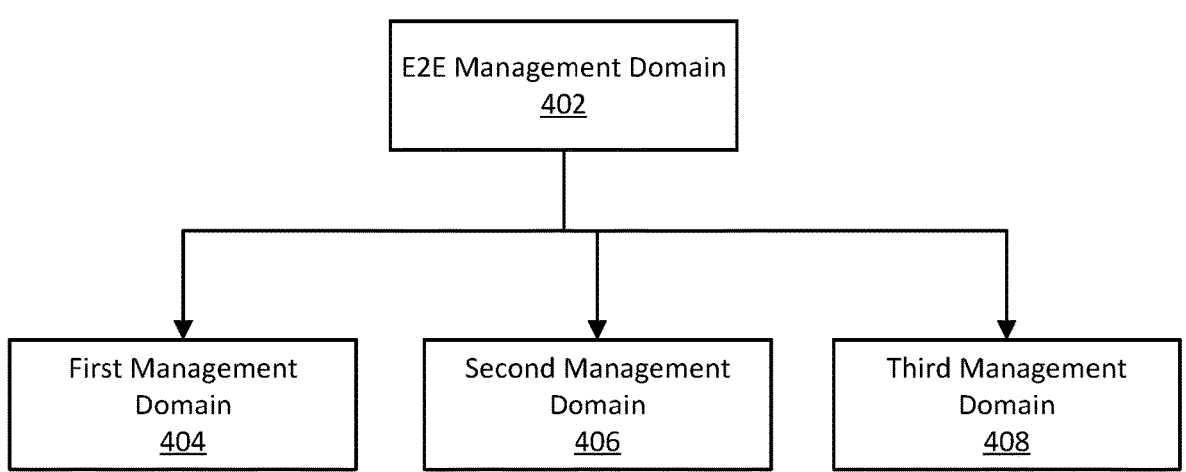

FIG. 4 is a hierarchical block diagram 400 illustrating one embodiment of a logical representation of management domains. The hierarchical domain 400 includes an E2E management domain 402. The E2E management domain 402 may manage a first management domain 404, a second management domain 406, and a third management domain 408.

Figure 5:
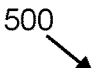
FIG. 5 is a hierarchical diagram illustrating one embodiment of deployment scenario of management domains.
Figure 5:
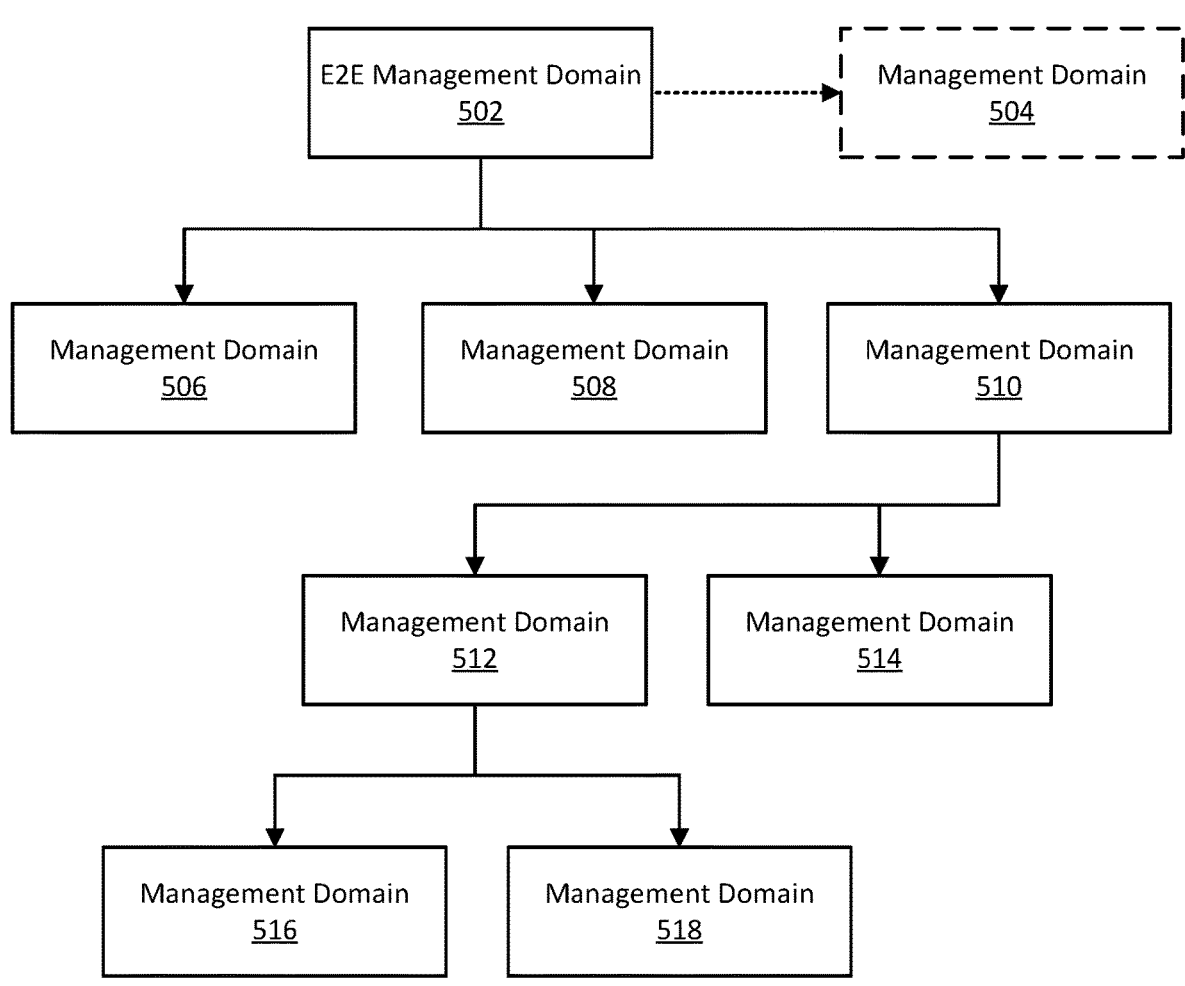

FIG. 5 shows one example of a possible deployment of management domains for an operator that provides services in US and Germany. As illustrated, only the German domain is further expanded to show a recursion in management domains. FIG. 5 is one example of the embodiment of FIG. 4 and further domains such as vendor specific management domains and/or equipment may exist.

Specifically, FIG. 5 is a hierarchical diagram 500 illustrating one embodiment of deployment scenario of management domains. The hierarchical domain 500 includes an E2E management domain 502. The E2E management domain 502 may manage a management domain 504 (e.g., external), a management domain 506 (e.g., US operator), a management domain 508 (e.g., transport network US-Germany), and a management domain 510 (e.g., Germany). Furthermore, the management domain 510 may manage a management domain 512 (e.g., North) and a management domain 514 (e.g., South). Moreover, the management domain 514 may manage a management domain 516 (e.g., cloud) and a management domain 518 (e.g., 3GPP).

In certain embodiments, such as in a 3GPP management plane, MDAS may collect and/or analyze data collected in the management plane. In various embodiments, MDAS functionality may be referred to as a generic analytics service. In some embodiments, statistical analysis and/or other machine learning techniques may be applied to make it possible for an analytics service (e.g., MDAS) to identify outlying managed entities. In certain embodiments, managed entities behavior may be outlying due to one or more of: compromised security; programming errors in a software system; incorrect or incompatible version of equipment used; and/or badly configured or designed equipment.

In various embodiments, based on a nature and/or reason for an outlying ME, an MDAS may recommend any one or more of the following actions: 1) issuing a notification to an MDAS consumer; and/or 2) suggesting any one of the possible corrective measures: a) issuing recommendations to an analytics consumer with possible alternative means and/or ways for continued operations (e.g., with an exclusion of the outlying ME) such as quarantine the outlying managed entity or transferring the responsibilities of the outlying ME to other equivalent MEs; b) a software management system providing and/or activating a replacement managed entity (e.g., with updated software version or replacement software from a different vendor, correct configurations etc.) to take over operations of the outlying ME; c) notifying the analytics consumer to enable the consumer to take further actions; d) a provisioning service deactivating and/or deallocating the outlying ME from a network with optionally provisioning and/or activating a replacement; e) issuing a notification to a monitoring service to collect further data at different periods or even different types of data; and/or f) activating logging of actions of the outlying ME. As may be appreciated, the embodiments described herein may apply to any management systems with analytics including cloud management, E2E, and/or domain management systems. As used herein, an outlying ME and/or exceptionally behaving ME may refer to an ME identified by an analytics service producer that behaves differently from other similar MEs.

In various embodiments, to be enabled to provide recommendations described herein, an analytics service may have access to data of an ME such as: an ME version (e.g., software version, hardware version); software and/or hardware vendor details; known compatibility issues relating to the ME; other relevant performance data of the ME and/or related MEs; and/or an ME fingerprint (e.g., to identify an exceptionally behaving ME from an initial configured version of the ME).

Figure 6:
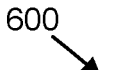
FIG. 6 is a communications diagram illustrating one embodiment of communications in a system.
Figure 6:
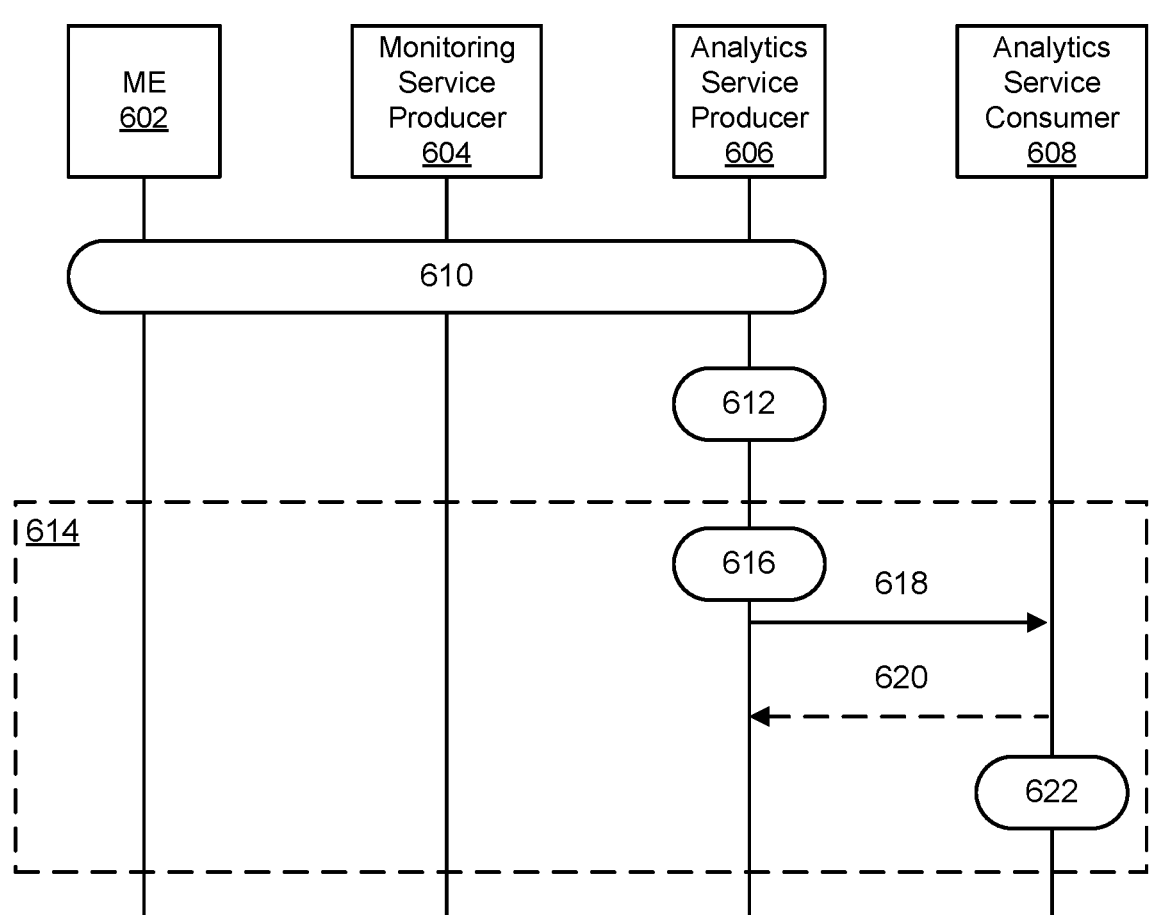

FIG. 6 is a communications diagram illustrating one embodiment of communications 600 in a system. The communications 600 include communications transmitted between an ME 602, a monitoring service producer 604, an analytics service producer 606, and an analytics service consumer 608. As used herein, any of the communications 600 may include one or more messages.

In a first communication 610 transmitted between the ME 602, the monitoring service producer 604, and the analytics service producer 606, the analytics service producer 606 collects data for several managed entities (e.g., the ME 602) via the monitoring service producer 604. The analytics service producer 606 regularly analyses 612 this data for identifying exceptional and/or outlying ME performance data. In some embodiments, an ME with exceptional and/or outlying ME performance data may be identified 614. Specifically, exceptional and/or outlying ME data performance may show out of normal behavior for MEs which may point to various issues such as errors in a network, potential mis-operations, errors in programming, incorrect installations, configurations, ME incompatibility, security vulnerabilities, and/or security issues in the functioning of the ME or a combination of MEs. If an outlying ME is identified 616 by the analytics service producer 606, the analytics service producer 606 issues a notification to an appropriate set of analytics service consumers (e.g., the analytics service consumer 608) with the reason of the exception and the possible resolutions and associated information. In various embodiments, the monitoring service producer 604 may be configured to collect appropriate data at an appropriate time from the MEs. In certain embodiments, the analytics consumers may be configured to listen to an analytics service.

As part of the first communication 610, the monitoring service producer 604 regularly collects streaming or file-based data from managed entities and reports it periodically (e.g., action driven or on-demand) to the analytics service producer 606 for analysis. The period of data collection, data streaming, or analytics may all be different. As described herein, the analytics service producer 606 analyses 612 the collected data. This analysis can be done periodically or be activated by a trigger such as threshold crossing notification configured over the monitoring data.

If the analytics service producer 606 identifies 616 an exceptionally behaving ME or set of MEs, in a second communication 618, the analytics service producer 606 notifies the appropriate analytics service consumer (e.g., the analytics service consumer 608). The notification may include one or more of the following: identifiers of an exceptionally behaving ME or set of MEs (e.g., may be more than one); identifiers of other associated or affected MEs; reasons for an exceptional behavior identification; a severity of an exception; associated monitored data; a recommended resolution (e.g., one or more resolutions described herein); and/or a reference to previous of other relevant occurrences. In certain embodiments, the analytics service consumer 608 of such a notification may include a dashboard of a human operator or a management logging system.

In a third communication 620 (e.g., optional), the analytics service consumer 608 may acknowledge the notification with a message to the analytics service producer 606. The acknowledgement may include information indicating whether a recommended resolution (e.g., if provided) of the analytics service was enacted on or rejected.

Based on the recommendation, the analytics service consumer 608 may be a management system, management service implementation, a management domain, or a human operator that may accept 622 or reject the recommendation. In some embodiments, recommendations may include, but are not limited to, one or more of the following: replace an ME; isolate and/or quarantine the ME; deactivate and/or delete the ME; and/or observe and/or collect related and/or detailed data from the ME (e.g., to help identification and/or classification of a type of outlying behavior, outlying status, and/or outlying reason).

Figure 7:
FIG. 7 is a communications diagram illustrating one embodiment of communications based on management services.

FIG. 7 is a communications diagram illustrating one embodiment of communications 700 based on management services. The communications 700 include communications transmitted between an ME 702, performance measurements collection 704 (or performance measurements streaming service producer), an analytics service producer 706 (e.g., anomaly detection service producer), an orchestration service producer 708, and a resource configuration producer 710. As used herein, any of the communications 700 may include one or more messages.

In a first communication 712 transmitted between the ME 702, the performance measurements collection 704, and the analytics service producer 706, the performance measurement collection 704 may collect steaming and/or file-based data from managed entities and report it periodically to the analytics service producer 706 for analysis. The periods of data collection, data streaming, and/or analytics may all be different.

The analytics service producer 706 (e.g., anomaly detection service producer) may use this data to analyze 714 exceptionally misbehaving managed entities, anomalies in an ME setup, and/or anomalies in an ME operation.

In some embodiments, an ME with exception behavior may be optionally identified 716 by the analytics service producer 706. Specifically, an exceptionally behaving ME (e.g., NF) may be identified 718 by the analytics service producer 706. For example, the analytics service producer 706 may identify a change in traffic behavior in terms of a number of connections, throughput, and/or unexpected protocol requests (e.g., if all NFs send out 15 GB of data per hour and a similar type of NF instance NF1 sends out 100 GB of data per hour over the same period, then NF1 could be identified as an exceptionally behaving NF by the analytics service. This could be because NF1 uses the previous erroneous version of software and has not been updated yet).

In a second communication 720 transmitted from the analytics service producer 706 to the orchestration service producer 708, the analytics service producer 706 issues a notification that may include: an identifier of a misbehaving and/or compromised ME; and/or a recommended action such as a software update to a latest version. In some embodiments, a consumer of such a notification may include a dashboard of a human operator or a management logging system.

In a third communication 722 transmitted from the orchestration service producer 708 to the analytics service producer 706, the orchestration service producer 708 acknowledges the notification thereby accepting the recommendation of the analytics service producer 706.

In a fourth communication 724 transmitted from the orchestration service producer 708 to the resource configuration service producer 710, the orchestration service producer 708 may use the resource configuration service producer 710 to: provision a replacement ME for the ME 702; deactivate and/or uninstall the ME 702; update ME 702 software installation in the ME 702; redeploy a replacement of the ME 702 which includes transfer of a state if applicable. In some embodiments, the fourth communication 724 may include applicable states or sessions of the ME 702 to be transferred to the new ME. As may be appreciated, a transfer without a state may imply that a new ME is to be instantiated with identical responsibilities as the ME 702 with no state or session transferred.

In a fifth communication 726 transmitted from the resource configuration service producer 710 to the ME 702, the resource configuration service producer 710 may transmit a deactivate, terminate, and/or uninstall request to the ME 702 (or the ME's element management system) while potentially preserving its state and/or sessions for later analysis.

In various embodiments, the resource configuration service producer 710 may update 728 the ME 702 software version. In a sixth communication 730 transmitted from the resource configuration service producer 710 to an ME-R 732, the replacement ME-R 732 is instantiated by the resource configuration service producer 710 and relevant knowledge (e.g., states and sessions) from the ME 702 may be applied. The sixth communication 730 may include information used to provision the ME-R 732 as the replacement for the ME 702.

In certain embodiments, such as the embodiment illustrated in FIG. 7, the orchestration service producer 708 may be configured as the consumer of the analytics service. The resource configuration service producer 710, or another service responsible for software management of the ME 702 may directly consume the recommendations from the analytics service producer 706 transmitted to the orchestration service producer 708.

Figure 8:
FIG. 8 is a communications diagram illustrating another embodiment of communications based on management service.

FIG. 8 is a communications diagram illustrating another embodiment of communications 800 based on management service. The communications 800 include communications transmitted between an ME 802 (e.g., SMF), a performance assurance service producer 804, an MDAS producer 806

(e.g., MDAF), and a provisioning service producer 808. As used herein, any of the communications 800 may include one or more messages.

In a first communication 810 transmitted between an ME 802, a performance assurance service producer 804, and an MDAS producer 806, the performance assurance service producer 804 regularly collects steaming and/or file-based data from managed entities (e.g., the ME 802) and reports it periodically to the MDAS producer 806 for analysis. The periods of data collection, data streaming, or analytics may all be different.

The MDAS producer 806 uses this data to analyze 812 exceptionally behaving managed entities.

In some embodiments, an ME with exception behavior may be optionally identified 814 by the MDAS producer 806. Specifically, an exceptionally behaving ME (e.g., NSI) is identified 816. For example, if all NSIs of similar types experience a PDU session setup failure rate of X per hour and another similar type of NSI, namely NSI1 experiences 10 times that over the same period, than NSI1 may be identified as an exceptionally behaving ME by the analytics service of the MDAS producer 806. In this example, the reason may be determined that NSI1 the ME 802 uses SMF software from Vendor A an all other NSI use vendor B software.

In a second communication 818 transmitted from the MDAS producer 806 to the provisioning service producer 808, the MDAS producer 806 issues a notification that may include: an identifier of a misbehaving ME (e.g., ME 802); and/or a recommended action such as replacing the ME 802 with software images from Vendor B. In some embodiments, a consumer the notification may include a dashboard of a human operator or a management logging system.

In a third communication 820 transmitted from the provisioning service producer 808 to the MDAS producer 806, the provisioning service producer 808 acknowledges the notification accepting the recommendation of the MDAS producer 806.

In certain embodiments, in a fourth communication 822 transmitted from the provisioning service producer 808 to the ME 802, the provisioning service producer 808 deactivates, terminates, and/or deletes the ME 802. In various embodiments, a state and other instance specific information about the ME 802 may be saved.

In various embodiments, in a fifth communication 824 transmitted from the provisioning service producer 808 to an ME-R 826 (e.g., SMF-R), the provisioning service producer 808 creates a new NF instance from software from vendor B—for example.

In some embodiments, in a sixth communication 828 transmitted from the provisioning service producer 808 to the ME-R 826, the provisioning service producer 808, after the ME-R 826 is created, may transmit state and session information from the deleted ME 802 to be applied to the ME-R 826.

In certain embodiments, a management analytics entity may identify exceptionally performing managed entities automatically based on gathered data (e.g., problems with software management of the entities). In various embodiments, a management analytics entity may use a management domain, management service producer, or management system that provides a functionality to take actions such as update a software version or firmware version of a managed entity. In some embodiments, to limit service interruptions of current interactions with other network functions, a trigger, to start restoration procedures of a managed entity, may be initiated to smoothly replace the managed entity for further actions.

In some embodiments, identification and/or resolution of exceptionally behaving entities may free up an operator from mundane management tasks and may avoiding network issues due to incorrect usage, malicious, incompatible, error prone versions of the managed entity (e.g., such as software version), and/or other issues that may not have been identified during testing.

FIG. 9 is a flow chart diagram illustrating one embodiment of a method 900 for determining a network system issue. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes determining 902, at a first network device, a system issue corresponding to at least one second network device, wherein the first network device is an analytics entity in a cellular network and the at least one second network device is a managed entity in the cellular network, and the system issue comprises a software issue, a hardware issue, a compatibility issue, an issue with an interaction between a plurality of second network devices comprising the at least one second network device, an issue with an interaction between the at least one second network device and another device, or some combination thereof, and wherein the analytics entity comprises an entity that analyzes one or more devices to determine descriptive analytics, predictive analytics, prescriptive analytics, or some combination thereof. In various embodiments, the method 900 includes providing 904 a notification indicating the system issue.

In certain embodiments, determining the system issue comprises determining the system issue based on performance of the at least one second network device. In some embodiments, determining the system issue comprises determining the system issue based on a current behavior of the at least one second network device, an expected behavior of the at least one second network device, a prior behavior of a device similar to the at least one second network device, or some combination thereof. In various embodiments, determining the system issue comprises determining the system issue based on a current system state of the at least one second network device, an expected state of the at least one second network device, a prior system state of the at least one second network device, or some combination thereof.

In one embodiment, determining the system issue comprises determining the system issue based on one or more threshold values. In certain embodiments, providing the notification indicting the system issue includes transmitting: at least one identifier corresponding to the at least one second network device; at least one identifier corresponding at least one third network device associated with the at least one second network device; an indication of the system issue; a severity of the system issue; monitored data corresponding to the system issue; a proposed resolution to the system issue; information about a prior occurrence of the system issue; or some combination thereof. In some embodiments, the method 900 further comprises implementing a resolution of the system issue.

In various embodiments, the resolution of the system issue comprises: isolation of the at least one second network device; deactivation of the at least one second network device; removal of the at least one second network device;

replacing the at least one second network device; onboarding a replacement of the at least one second network device; configuring the replacement of the at least one second network device; deploying the replacement of the at least one second network device; activating the replacement of the at least one second network device; transferring information corresponding to the at least one second network device to the replacement of the at least one second network device; updating a software version; changing the software version; updating a firmware version; changing the firmware version; changing the software to another implementation; or some combination thereof. In one embodiment, the information corresponding to the at least one second network device comprises state information related to the at least one second device, session information within the at least one second device, configuration information of the at least one second device, or some combination thereof. In certain embodiments, a third network device is configured to perform the resolution of the system issue. In some embodiments, the notification comprises: changes in a system state; an incorrect software version; a correct or updated software version needed; an incorrect firmware version; a correct or updated firmware version needed; a hardware incompatibility; a software incompatibility; an incorrect hardware version; recommended resolutions; or some combination thereof.

In one embodiment, a method comprises: determining, at a first network device, a system issue corresponding to at least one second network device, wherein the first network device is an analytics entity in a cellular network and the at least one second network device is a managed entity in the cellular network, and the system issue comprises a software issue, a hardware issue, a compatibility issue, an issue with an interaction between a plurality of second network devices comprising the at least one second network device, an issue with an interaction between the at least one second network device and another device, or some combination thereof, and wherein the analytics entity comprises an entity that analyzes one or more devices to determine descriptive analytics, predictive analytics, prescriptive analytics, or some combination thereof and providing a notification indicating the system issue.

In certain embodiments, determining the system issue comprises determining the system issue based on performance of the at least one second network device.

In some embodiments, determining the system issue comprises determining the system issue based on a current behavior of the at least one second network device, an expected behavior of the at least one second network device, a prior behavior of a device similar to the at least one second network device, or some combination thereof.

In various embodiments, determining the system issue comprises determining the system issue based on a current system state of the at least one second network device, an expected state of the at least one second network device, a prior system state of the at least one second network device, or some combination thereof.

In one embodiment, determining the system issue comprises determining the system issue based on one or more threshold values.

In certain embodiments, providing the notification indicting the system issue includes transmitting: at least one identifier corresponding to the at least one second network device; at least one identifier corresponding at least one third network device associated with the at least one second network device; an indication of the system issue; a severity of the system issue; monitored data corresponding to the system issue; a proposed resolution to the system issue; information about a prior occurrence of the system issue; or some combination thereof.

In some embodiments, the method further comprises implementing a resolution of the system issue.

In various embodiments, the resolution of the system issue comprises: isolation of the at least one second network device; deactivation of the at least one second network device; removal of the at least one second network device; replacing the at least one second network device; onboarding a replacement of the at least one second network device; configuring the replacement of the at least one second network device; deploying the replacement of the at least one second network device; activating the replacement of the at least one second network device; transferring information corresponding to the at least one second network device to the replacement of the at least one second network device; updating a software version; changing the software version; updating a firmware version; changing the firmware version; changing the software to another implementation; or some combination thereof.

In one embodiment, the information corresponding to the at least one second network device comprises state information related to the at least one second device, session information within the at least one second device, configuration information of the at least one second device, or some combination thereof.

In certain embodiments, a third network device is configured to perform the resolution of the system issue.

In some embodiments, the notification comprises: changes in a system state; an incorrect software version; a correct or updated software version needed; an incorrect firmware version; a correct or updated firmware version needed; a hardware incompatibility; a software incompatibility; an incorrect hardware version; recommended resolutions; or some combination thereof.

In one embodiment, an apparatus comprises a first network device, the apparatus including: a processor that: determines a system issue corresponding to at least one second network device, wherein the first network device is an analytics entity in a cellular network and the at least one second network device is a managed entity in the cellular network, and the system issue comprises a software issue, a hardware issue, a compatibility issue, an issue with an interaction between a plurality of second network devices comprising the at least one second network device, an issue with an interaction between the at least one second network device and another device, or some combination thereof, and wherein the analytics entity comprises an entity that analyzes one or more devices to determine descriptive analytics, predictive analytics, prescriptive analytics, or some combination thereof; and provides a notification indicating the system issue.

In certain embodiments, the processor determining the system issue comprises the processor determining the system issue based on performance of the at least one second network device.

In some embodiments, the processor determining the system issue comprises the processor determining the system issue based on a current behavior of the at least one second network device, an expected behavior of the at least one second network device, a prior behavior of a device similar to the at least one second network device, or some combination thereof.

In various embodiments, the processor determining the system issue comprises the processor determining the system issue based on a current system state of the at least one second network device, an expected state of the at least one second network device, a prior system state of the at least one second network device, or some combination thereof.

In one embodiment, the processor determining the system issue comprises the processor determining the system issue based on one or more threshold values.

In certain embodiments, the apparatus further comprises a transmitter, wherein the processor providing the notification indicting the system issue includes the transmitter transmitting: at least one identifier corresponding to the at least one second network device; at least one identifier corresponding at least one third network device associated with the at least one second network device; an indication of the system issue; a severity of the system issue; monitored data corresponding to the system issue; a proposed resolution to the system issue; information about a prior occurrence of the system issue; or some combination thereof.

In some embodiments, the processor implements a resolution of the system issue.

In various embodiments, the resolution of the system issue comprises: isolation of the at least one second network device; deactivation of the at least one second network device; removal of the at least one second network device; replacing the at least one second network device; onboarding a replacement of the at least one second network device; configuring the replacement of the at least one second network device; deploying the replacement of the at least one second network device; activating the replacement of the at least one second network device; transferring information corresponding to the at least one second network device to the replacement of the at least one second network device; updating a software version; changing the software version; updating a firmware version; changing the firmware version; changing the software to another implementation; or some combination thereof.

In one embodiment, the information corresponding to the at least one second network device comprises state information related to the at least one second device, session information within the at least one second device, configuration information of the at least one second device, or some combination thereof.

In certain embodiments, a third network device is configured to perform the resolution of the system issue.

In some embodiments, the notification comprises: changes in a system state; an incorrect software version; a correct or updated software version needed; an incorrect firmware version; a correct or updated firmware version needed; a hardware incompatibility; a software incompatibility; an incorrect hardware version; recommended resolutions; or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a first network device for managing a cellular network, the first network device being in the cellular network, the method comprising:

receiving session management function (SMF) data from at least one second network device within the cellular network, wherein the at least one second network device is a managed entity in the cellular network, and wherein the SMF data comprises one or more of a hardware version, a software vendor, a hardware vendor, managed entity (ME) compatibility information, or a ME fingerprint;

analyzing the SMF data;

determining a system issue corresponding to the at least one second network device based on the analyzed SMF data from the at least one second network device, wherein the system issue comprises a software issue, a hardware issue, a compatibility issue, an issue with an interaction between a plurality of second network devices comprising the at least one second network device, or an issue with an interaction between the at least one second network device and another device, or a combination thereof, and wherein the first network device comprises a management data analytics function (MDAF);

making a prediction based on the analyzed SMF data using predictive analytics performed on one or more cellular network devices; and providing, to a third network device, a message indicating the system issue and a proposed resolution for the system issue using a wireless communication network service, wherein the third network device comprises an MDAF consumer.

2. The method of claim 1, wherein determining the system issue comprises determining the system issue based on performance of the at least one second network device.

3. The method of claim 1, wherein determining the system issue comprises determining the system issue based on a current behavior of the at least one second network device, an expected behavior of the at least one second network device, a prior behavior of a device similar to the at least one second network device, or a combination thereof.

4. The method of claim 1, wherein determining the system issue comprises determining the system issue based on a current system state of the at least one second network device, an expected state of the at least one second network device, a prior system state of the at least one second network device, or a combination thereof.

5. The method of claim 1, wherein determining the system issue comprises determining the system issue based on one or more threshold values.

6. The method of claim 1, wherein providing the message indicting the system issue comprises transmitting:

at least one identifier corresponding to the at least one second network device;

at least one identifier corresponding at least one third network device associated with the at least one second network device;

an indication of the system issue;

a severity of the system issue;

monitored data corresponding to the system issue;

information about a prior occurrence of the system issue; or a combination thereof.

7. The method of claim 1, further comprising implementing the proposed resolution to the system issue.

8. The method of claim 7, wherein the proposed resolution to the system issue comprises:

isolation of the at least one second network device;

deactivation of the at least one second network device;

removal of the at least one second network device;

replacing the at least one second network device;

onboarding a replacement of the at least one second network device;

configuring the replacement of the at least one second network device;

deploying the replacement of the at least one second network device;

activating the replacement of the at least one second network device;

transferring information corresponding to the at least one second network device to the replacement of the at least one second network device;

updating a software version;

changing the software version;

updating a firmware version;

changing the firmware version;

changing a software to another implementation; or a combination thereof.

9. The method of claim 8, wherein the information corresponding to the at least one second network device comprises state information related to the at least one second network device, session information within the at least one second network device, or configuration information of the at least one second network device, or a combination thereof.

10. The method of claim 9, wherein the third network device is configured to perform the proposed resolution of the system issue.

11. The method of claim 1, wherein the message comprises:

changes in a system state;

an incorrect software version;

a correct or updated software version needed;

an incorrect firmware version;

a correct or updated firmware version needed;

a hardware incompatibility;

a software incompatibility;

an incorrect hardware version;

recommended resolutions; or a combination thereof.

12. A first network device for managing a cellular network, the first network device being in the cellular network, the first network device comprising:

at least one memory; and at least one processor coupled with the at least one memory and configured to cause the first network device to:

receive session management function (SMF) data from at least one second network device within the cellular network, wherein the at least one second network device is a managed entity in the cellular network, and wherein the SMF data comprises one or more of a hardware version, a software vendor, a hardware vendor, managed entity (ME) compatibility information, or a ME fingerprint;

analyze the SMF data;

determine a system issue corresponding to the at least one second network device based on the analyzed SMF data from the at least one second network device, wherein the system issue comprises a software issue, a hardware issue, a compatibility issue, an issue with an interaction between a plurality of second network devices comprising the at least one second network device, or an issue with an interaction between the at least one second network device and another device, or a combination thereof, and wherein the first network device comprises a management data analytics function (MDAF);

make a prediction based on the analyzed SMF data using predictive analytics performed on one or more cellular network devices; and provides, to a third network device, a message indicating the system issue and a proposed resolution for the system issue using a wireless communication network service, wherein the third network device comprises an MDAF consumer.

13. The first network device of claim 12, wherein the at least one processor is configured to cause the first network device to determine the system issue based on performance of the at least one second network device.

14. The first network device of claim 12, wherein the at least one processor is configured to cause the first network device to determine the system issue based on a current behavior of the at least one second network device, an expected behavior of the at least one second network device, a prior behavior of a device similar to the at least one second network device, or a combination thereof.

15. The first network device of claim 12, wherein the at least one processor is configured to cause the first network device to determine the system issue based on a current system state of the at least one second network device, an expected state of the at least one second network device, a prior system state of the at least one second network device, or a combination thereof.

16. The first network device of claim 12, wherein the at least one processor is configured to cause the first network device to determine the system issue based on one or more threshold values.

17. The first network device of claim 12, wherein the at least one processor is configured to cause the first network device to transmit:

at least one identifier corresponding to the at least one second network device;

at least one identifier corresponding at least one third network device associated with the at least one second network device;

an indication of the system issue;

a severity of the system issue;

monitored data corresponding to the system issue;

information about a prior occurrence of the system issue; or a combination thereof.

18. The first network device of claim 12, wherein the at least one processor is configured to cause the first network device to implement the proposed resolution to the system issue.

19. The first network device of claim 18, wherein the proposed resolution to the system issue comprises:

isolation of the at least one second network device;

deactivation of the at least one second network device;

removal of the at least one second network device;

replacing the at least one second network device;

onboarding a replacement of the at least one second network device;

configuring the replacement of the at least one second network device;

deploying the replacement of the at least one second network device;

activating the replacement of the at least one second network device;

transferring information corresponding to the at least one second network device to the replacement of the at least one second network device;

updating a software version;

changing the software version;

updating a firmware version;

changing the firmware version;

changing a software to another implementation; or a combination thereof.

20. The first network device of claim 19, wherein the information corresponding to the at least one second network device comprises state information related to the at least one second network device, session information within the at least one second network device, configuration information of the at least one second network device, or a combination thereof.

*     *     *     *     *